United States Patent Office 3,495,942
Patented Feb. 17, 1970

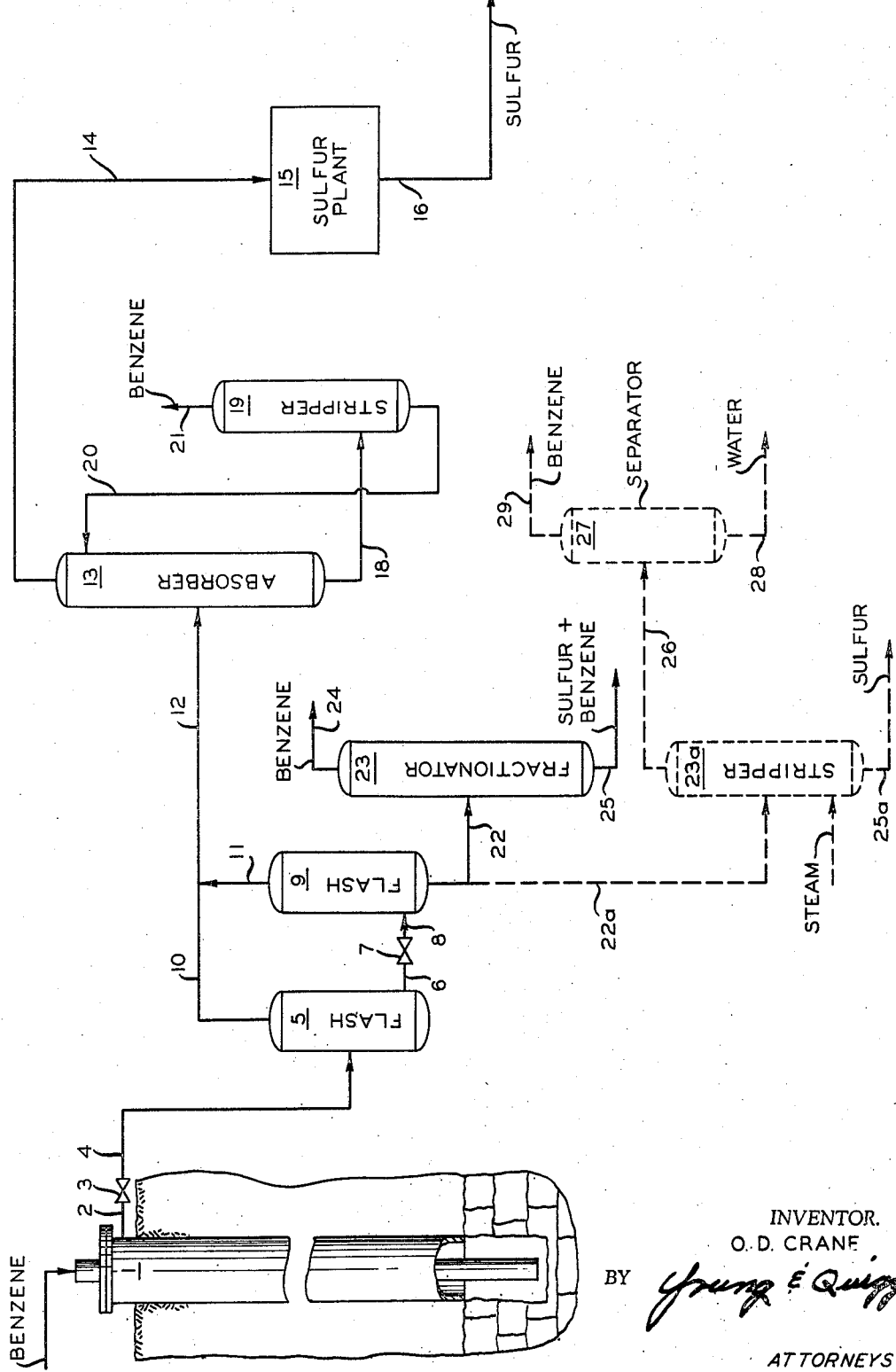

1

3,495,942
RECOVERY OF SULFUR AND HYDROGEN SULFIDE FROM ADMIXTURE WITH BENZENE BY FLASH DISTILLATION WITH SUBSEQUENT BOTTOMS DISTILLATION
Oliver D. Crane, Bartlesville, Okla., assignor, by mesne assignments, to U.S. Philips Corporation, New York, N.Y., a corporation of Delaware
Filed Dec. 18, 1967, Ser. No. 691,607
Int. Cl. C01b *17/04, 17/16*
U.S. Cl. 23—225         4 Claims

ABSTRACT OF THE DISCLOSURE

Benzene which has been used to dissolve sulfur in an $H_2S$ producing well and which contains sulfur, hydrogen sulfide and carbon dioxide is flashed to produce a stream containing gas and some benzene and a stream containing sulfur. The former stream is treated in an oil absorber system to absorb and to recover for reuse the benzene while gas is passed from the system as to a sulfur plant to produce sulfur therefrom. The latter stream is fractionated to recover benzene for reuse and an off-specification sulfur containing some benzene. In an alternate embodiment in lieu of the fractionation, the latter stream is steam stripped recovering benzene for reuse and a low viscosity molten sulfur at a temperature in the range 200–300° F.

RECOVERY OF SULFUR AND HYDROGEN SULFIDE FROM ADMIXTURE WITH BENZENE

This invention relates to the recovery of sulfur and hydrogen sulfide from admixture with benzene. In one of its aspects it relates to the recovery of hydrogen sulfide and sulfur from a gas well from which it has been obtained in solution in benzene which has been circulated through said well.

In one of its concepts the invention provides a method for recovering sulfur and hydrogen sulfide from benzene in which it is contained, as recovered from a hydrogen sulfide producing well, which comprises flashing the benzene solution as it comes from the well, preferably in two stages, to produce an acid or $H_2S$-containing gas, also containing benzene, and a bottoms containing sulfur. The acid gas containing benzene is subjected to a lean oil absorption recovery, the benzene being recovered in the oil and recovered from the thus enriched oil by stripping and reused while the gas from the oil absorption step is passed to a sulfur plant and there converted to sulfur. In another of its concepts the bottoms from the flashing which contain sulfur are fractionated to recover benzene and an off-specification sulfur containing some benzene. In a still further concept of the invention the said bottoms from the flash step, in lieu of being fractionated or in addition thereto, are subjected to steam stripping to recover a low viscosity molten sulfur, i.e., sulfur at a temperature at which it can be readily pumped and otherwise handled and benzene which after separation of condensate, resulting from the steam, can be reused.

In a typical hydrogen sulfide gas well, it is possible to obtain enough acid gas to produce of the order of 90 to 100 tons per day of sulfur. Such a well would be flowing 4,000M c.f.d. of gas.

This gas will contain elemental sulfur and it is this sulfur which is being recovered along with the acid gas.

2

Certain underground formations produce a gas which contains elemental sulfur in solution. Such wells are often difficult to produce continuously because the sulfur comes out of the solution in the producing pipe or pipes and prevents the gas flow. Indeed the sulfur collects on the pipe walls until at some point it completely fills the pipe. Accordingly, benzene has been proposed to remove more or less continuously from the well the sulfur which would otherwise collect in the pipe.

It is an object of this invention to provide a process for the recovery of sulfur and hydrogen sulfide from benzene. Another object of the invention is to produce sulfur from hydrogen sulfide and sulfur contained in benzene which has been used to recover these constituents from an acid gas well.

Other aspects, concepts, and objects of the invention are apparent from a study of this disclosure, the drawing and the appended claims.

According to the present invention, there is provided a method for the recovery of sulfur and hydrogen sulfide from admixture with benzene which comprises steps as follow. Flashing a stream of said benzene to produce a vapor stream containing hydrogen sulfide and some benzene and a bottoms stream containing sulfur and benzene, recovering hydrogen sulfide and benzene from said vapor stream and subjecting said hydrogen sulfide to conditions to produce sulfur therefrom, fractionating said bottoms stream to recover benzene therefrom and sulfur yet containing some benzene.

Still according to the present invention, the bottoms which are recovered can be steam stripped to produce specification sulfur and additional quantities of benzene which can be reused.

Referring now to the drawing, 1 is a gas well into which benzene at 250° F. is pumped at a rate of 2,000 barrels per day and a pressure of 6,500 pounds per square inch. Benzene containing hydrogen sulfide, sulfur, carbon dioxide as its principal components is removed from the well by pipe 2 at a temperature of 200° F. and a pressure of 3,000 p.s.i.g., and is passed through pressure release valve 3 and by pipe 4 to first flash chamber 5. In this chamber the pressure is at approximately 800 pounds per square inch and from it there is taken overhead a vapor stream containing the gases and some benzene, bottoms are passed from 5 by pipe 6, pressure release valve 7 and pipe 8 into second flash chamber 9 in which the pressure is at approximately 25 pounds per square inch. From this second flash chamber additional quantities of acid gas and benzene are taken overhead as a vaporous stream. Thus, the streams in pipes 10 and 11 are combined in pipe 12 and passed by 12 to oil absorption system 13 from which hydrogen sulfide containing gas is passed by pipe 14 to sulfur plant 15 from which sulfur is recovered at 16. Absorption oil containing benzene is taken from system 13 by pipe 18 and passed to benzene and oil recovery system 19. In 19 benzene is stripped from the oil which is removed at 20 and which can be reused in system 13 while benzene is taken overhead at 21 and disposed of for further use as by passing it to a storage tank, not shown, for sake of simplicity. Bottoms from flash chamber 9 passed by pipe 22 into fractionator 23 from which benzene is taken overhead at 24. This benzene also can be reused. Bottoms containing off-specification sulfur and some benzene are obtained at 25. A typical material balance for the operation just described follows.

| Component | Stream No. | | | | | | | | |
|---|---|---|---|---|---|---|---|---|---|
| | 2 | 12 | 22 | 24 | 25 | 14 | 21 | 20 | 16 |
| Sulfur, mols/day | 920 | 0 | 930 | 0 | 930 | 0 | 0 | 0 | [1] 100 |
| Hydrogen sulfide, mols/day | 8,226 | 8,144 | 82 | 82 | 0 | 8,100 | 44 | 0 | |
| Carbon dioxide mols/day | 2,134 | 2,134 | 0 | 0 | 0 | 2,100 | 34 | 0 | |
| Nitrogen, mols/day | 30 | 30 | 0 | 0 | 0 | 29 | 1 | 0 | |
| Methane, mols/day | 164 | 164 | 0 | 0 | 0 | 160 | 4 | 0 | |
| Benzene, mols/day | 7,926 | 1,380 | 6,546 | 6,300 | 246 | 30 | 1,350 | 0 | |
| Water, mols/day | 256 | 128 | 128 | 128 | 0 | 125 | 3 | 0 | |
| Absorption oil, gal./day | 0 | 0 | 0 | 0 | 0 | 0 | 0 | [2] 120,000 | |
| Total, mols/day | 19,666 | 11,980 | 7,686 | 6,510 | 1,176 | 10,544 | 1,436 | | |

[1] Tons per day.  [2] Gallons per day.

As an alternate procedure as shown in the dashed lines in the drawing, bottoms from flash chamber 9 can be passed by pipe 22a to steam stripping operation 23a wherein the bottoms are steam stripped to produce a low viscosity molten sulfur recovered at 25a. Overhead consisting of benzene and water vapor is taken off by 26 and passed to phase separation system 27 from which water is removed at 28 and benzene which can be reused is taken off at 29.

Processes for converting hydrogen sulfide to sulfide are well known and, therefore, are not described herein. U.S. Patent No. 3,026,184, for example, described such a sulfur production process in detail.

One skilled in the art will recognize that the drawing which has been described is but a diagrammatic disclosure of the principal steps involved in the method of the invention. Apparatus components have been omitted to a very large extent for sake of simplicity. The use of certain components in the drawing does not mean that other components may or will not be used. The drawing is addressed to one skilled in the art.

The use of benzene as the now preferred solvent has been set forth in connection with the description of the method of the invention. Solubility of the sulfur under the preferred non-reactive conditions of the invention is, of course, important to the efficient operation of the invention under a wide variety of conditions of operation. This is why benzene is the now preferred solvent. Other reasons might be given. Suffice to say that it is possible to operate the invention by replacing part or all of the benzene with other aromatic possessing good sulfur solubility. Included are such solvents such as toluene, the xylenes and oils such as light cycle oils resulting from cracking of petroleum oil or other hydrocarbonaceous materials and which are therefore aromatic in character.

In a copending application S.N. 691,493, filed December 18, 1967 by William A. McClintock and Leo L. Politte, there is set forth a method for the recovery of sulfur and hydrogen sulfide from a solvent containing the same which comprises fractionating said solvent to produce a vaporous stream containing hydrogen sulfide and some solvent and a bottoms stream containing sulfur and solvent, recovering hydrogen sulfide and solvent from said vaporous stream, flashing said bottoms stream to obtain solvent vapor therefrom and a second bottoms stream, stripping said second bottoms stream to remove substantially all the remaining sulfur therefrom to thus obtain a solvent-free molten sulfur.

Also in a copending application S.N. 691,501 filed Dec. 18, 1967 by Maurice R. Dean and Henry B. Fisher, there is set forth a method for producing a gas well containing sulfur which comprises introducing into said well a solvent or medium which will take into itself the sulfur and then removing the solvent or medium from the well, separating gas from the solvent or medium and then treating the solvent or medium to recover sulfur therefrom.

Reasonable variation and modification are possible within the scope of the foregoing disclosure, the drawing and the appended claims to the invention the essence of which is that there has been provided a method for the recovery of sulfur and hydrogen sulfide from an acid gas well, the method comprising steps of flashing benzene which has been used to absorb sulfur and hydrogen sulfide in said well to produce an acid gas containing some benzene, treating the acid gas to recover benzene therefrom as by an oil absorption method, passing the hydrogen sulfide thus obtained to a sulfur plant to recover sulfur therefrom therein, passing bottoms obtained in the flashing to fractionation and/or steam stripping to recover additional quantities of benzene and sulfur.

I claim:

1. A method for the recovery of sulfur and hydrogen sulfide from a stream of benzene containing the same which comprises flashing said stream to produce a vaporous stream containing hydrogen sulfide and some benzene and a bottoms stream containing sulfur and benzene, recovering hydrogen sulfide and benzene each separately from said vaporous stream and subjecting said hydrogen sulfide to conditions to produce sulfur therefrom and fractionally distilling said bottoms stream to recover benzene therefrom and sulfur yet containing some benzene.

2. A method according to claim 1 wherein said bottoms are steam stripped in a stripping zone to produce sulfur and benzene.

3. A method according to claim 2 wherein the initial stream of benzene containing the sulfur and hydrogen sulfide is at an elevated pressure of the order of at least several hundred pounds per square inch, the flashing is effected in stages and the recovered benzene is reused.

4. A method according to claim 3 wherein the benzene containing the sulfur and hydrogen sulfide is at a temperature of the order of about 200° F. and at a pressure of the order of about 3,000 pounds per square inch.

References Cited

UNITED STATES PATENTS

| | | | |
|---|---|---|---|
| 461,431 | 10/1891 | Frasch | 299—5 |
| 2,613,174 | 10/1952 | Ockert | 203—88 |
| 2,798,034 | 7/1957 | Egbert et al. | 23—312 |
| 2,809,885 | 10/1957 | Ditman et al. | 23—312 |
| 2,860,030 | 11/1958 | Goldtrap et al. | 23—181 |
| 2,889,207 | 6/1959 | Eliot | 23—225 |
| 3,042,503 | 7/1962 | Tuller et al. | 23—312 |
| 3,219,415 | 11/1965 | Hensley | 23—225 |
| 3,362,133 | 1/1968 | Kutsher et al. | 55—73 |

WILBUR L. BASCOMB, JR., Primary Examiner

U.S. Cl. X.R.

23—181; 203—42, 79, 80, 88

UNITED STATES PATENT OFFICE

CERTIFICATE OF CORRECTION

Patent No. 3,495,942                                        Dated: February 17, 1970

It is certified that error appears in the above-identified patent and that said Letters Patent are hereby corrected as shown below:

Column 1, in the heading, in the line after the title after "assignor"

", by mesne assignments, to U. S. Philips Corporation, New York, N.Y." should read --- to Phillips Petroleum Company"

SIGNED AND
SEALED
JUL 21 1970

(SEAL)
Attest:

Edward M. Fletcher, Jr.
Attesting Officer

WILLIAM E. SCHUYLER, JR.
Commissioner of Patents